(12) United States Patent
Oostveen et al.

(10) Patent No.: US 7,907,211 B2
(45) Date of Patent: Mar. 15, 2011

(54) METHOD AND DEVICE FOR GENERATING AND DETECTING FINGERPRINTS FOR SYNCHRONIZING AUDIO AND VIDEO

(75) Inventors: Job Cornelis Oostveen, Eindhoven (NL); David Keith Roberts, Crawley (GB); Adrianus Johannes Maria Denissen, Eindhoven (NL); Warner Rudolph Theophile Ten Kate, Eindhoven (NL)

(73) Assignee: Gracenote, Inc., Emeryville, CA (US)

( * ) Notice: Subject to any disclaimer, the term of this patent is extended or adjusted under 35 U.S.C. 154(b) by 1456 days.

(21) Appl. No.: 10/566,003

(22) PCT Filed: Jul. 20, 2004

(86) PCT No.: PCT/IB2004/051259
§ 371 (c)(1),
(2), (4) Date: Jan. 20, 2006

(87) PCT Pub. No.: WO2005/011281
PCT Pub. Date: Feb. 3, 2005

(65) Prior Publication Data
US 2008/0062315 A1    Mar. 13, 2008

(30) Foreign Application Priority Data
Jul. 25, 2003   (EP) ................................. 03102301

(51) Int. Cl.
*H04N 9/475*   (2006.01)
*H04N 5/04*   (2006.01)
(52) U.S. Cl. ................ 348/515; 348/500; 348/512
(58) Field of Classification Search .......... 348/515, 348/512, 464, 500, 518; 704/216, 218, 237, 704/278, 500, 501, 503, 504; *H04N 9/475, H04N 5/04*
See application file for complete search history.

(56) References Cited

U.S. PATENT DOCUMENTS
7,359,006 B1 *   4/2008   Xiang et al. ................. 348/515
(Continued)

FOREIGN PATENT DOCUMENTS
EP     1204277 A2    5/2002
(Continued)

OTHER PUBLICATIONS

"An Efficient Database Search Strategy for Audio Filngerprinting" Jaap Haitsma et al, 2002 IEEE, p. 178-181.
"A Guide Tour of Video Watermarkting" W. Doerr et al, Signal Processing, Image Communicaiton, 18 (2003) p. 263-282.
"Feature Extraction and a Database Strategy for Video Fingerprinting" J. Oostveen et al, Visual 2002, LNCS, 2314, pp. 117-128 2002.

*Primary Examiner* — Trang U Tran
(74) *Attorney, Agent, or Firm* — Schwegman, Lundberg & Woessner, P.A.

(57) ABSTRACT

This invention relates to a device and a method of generating a first and a second fingerprint (102,104) usable for synchronisation of at least two signals (101,103) and corresponding method and device for synchronising two or more signals. A fingerprint pair is generated on the basis of a segment of a first signal e.g. an audio signal and of a segment of a second signal e.g. a video signal at each synchronisation time point. The generated fingerprint pair(s) are stored in a database (203) and communicated or distributed to a synchronisation device (303). During synchronisation, fingerprint(s) of the audio signal and fingerprint(s) of the video signal to be synchronised are generated and matched against fingerprints in the database. When a match is found, the fingerprints also determine the synchronisation time point, which is used to synchronise the two signals. In this way, a simple, reliable and efficient way of synchronising at least two signals is obtained. Further, this is enabled without modifying either the first and second signal (or subsequent signals). The signals may even be distorted or changed to some extent while still enabling synchronisation.

12 Claims, 5 Drawing Sheets

U.S. PATENT DOCUMENTS

| | | | |
|---|---|---|---|
| 7,627,477 B2 * | 12/2009 | Wang et al. | 704/273 |
| 2002/0120925 A1 | 8/2002 | Logan | |
| 2004/0148159 A1 * | 7/2004 | Crockett et al. | 704/211 |
| 2006/0156374 A1 * | 7/2006 | Hu et al. | 725/135 |

FOREIGN PATENT DOCUMENTS

| | | |
|---|---|---|
| WO | WO01/57783 A1 | 2/2001 |
| WO | WO01/61987 A2 | 8/2001 |

* cited by examiner

METHOD AND DEVICE FOR GENERATING AND DETECTING FINGERPRINTS FOR SYNCHRONIZING AUDIO AND VIDEO

The present invention relates to synchronisation between at least two signals. More specifically, the invention relates to a method, and a corresponding device, of synchronising a first signal, e.g. an audio signal, and a second signal, e.g. a video signal. The invention also relates to a method, and a corresponding device, of enabling synchronisation of an audio signal and a video signal. Further, the invention relates to a computer readable medium having stored thereon instructions for causing one or more processing units to execute the method according to the invention.

Synchronisation of a video stream with a corresponding audio stream is a difficult problem which has received a lot of attention. Many solutions to this problem have been proposed and implemented. Most of these solutions require manual synchronisation by a skilled operator. Typically the operator looks for visual clues within the picture to determine if the sound heard corresponds to the picture and that they are indeed synchronous. The problem becomes much harder when the synchronisation needs to be done automatically. This is a problem that is becoming more and more relevant, as processing and distribution of audio and video signals are becoming ever more complicated, both inside and outside a studio environment. An example of the latter is the following: A consumer records a movie with his video recorder. He would like to view it with the original sound-track. Therefore he buys the original soundtrack, which, for example, is streamed to him over the Internet. Now the audio and the video need to be synchronised automatically e.g. in/by his video recorder or another synchronisation device.

One previous system that would allow the automatic synchronisation of an audio and a video stream is marketed by Tektronix. In this system, the envelope of the audio signal is embedded by means of a watermark into the video signal. At any point in the distribution of processing chain, the actual audio envelope can be compared to the embedded one, from which the delay between the two streams can be derived. Subsequently, the delay of the audio is corrected to achieve synchronisation. However, this system requires the co-operation of the broadcaster or another distributor, because before transmission, the watermark needs to be embedded in the video. Further, this system can only associate one particular audio stream to the video. Once the envelope of an audio stream has been embedded, the system can only synchronise the video with that particular audio stream. For synchronising other audio streams, another watermark should have been embedded. Finally, the system is restricted to synchronisation between an audio stream and a video stream.

It is an object of the invention to provide a method and corresponding device for generating a first and a second fingerprint usable for synchronisation of at least two signals and corresponding method and device for synchronising two or more signals that solves the above-mentioned problems. A further object is to provide this in a simple and efficient way. Another object is to enable simple, reliable and accurate localisation of a given part of a multimedia signal. A further object is to enable automatic synchronisation between a first signal and at least a second signal without modifying any of the signals This is achieved by a method (and corresponding device) of enabling synchronisation of a first and a second signal, the method comprising the steps of deriving a first fingerprint on the basis of a segment of the first signal, where the segment of the first signal is unambiguously related with a first synchronisation time point, deriving a second fingerprint on the basis of a segment of the second signal, where the segment of the second signal is unambiguously related with a second synchronisation time point, and supplying the first and second fingerprints to a synchronisation device and by a method (and corresponding device) of synchronising two or more signals, the method comprising the steps of:

generating a first fingerprint stream on the basis of a first signal, generating a second fingerprint stream on the basis of a second signal, comparing a segment of the first fingerprint stream with one or more first fingerprints stored in at least one database in order to determine if a match exists or not, comparing a segment of the second fingerprint stream with one or more second fingerprints stored in the at least one database in order to determine if a match exists or not, and if a match exists for both a first and a second fingerprint determining a location of a first synchronisation time point for the first signal and a location of a second synchronisation time point for the second signal and synchronising the first and the second signal using the determined locations.

In this way, a simple, reliable and efficient way of synchronising at least two signals is obtained. Further, this is enabled without modifying either the first and second signal (or subsequent signals). The signals may even be distorted or changed to some extent while still enabling accurate synchronisation due to the use of fingerprints.

A fingerprint of a multimedia object/content/signal is a representation of perceptual features of the object/content/signal part in question. Such fingerprints are sometimes also known as "(robust) hashes". More specifically, a fingerprint of a piece of audio or video is an identifier which is computed over that piece of audio or video and which does not substantially change even if the content involved is subsequently transcoded, filtered or otherwise modified.

Advantageous embodiments of the methods and devices according to the present invention are defined in the subclaims.

Further, the invention also relates to a computer readable medium having stored thereon instructions for causing one or more processing units to execute the method according to the present invention.

Figure 1A:
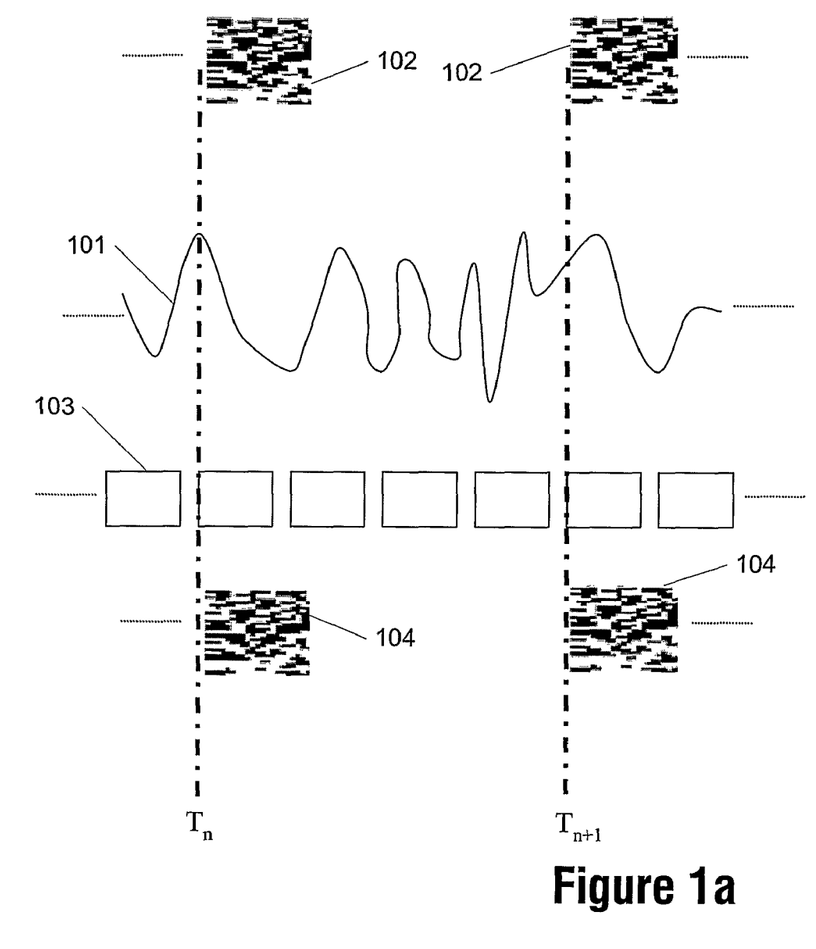
FIG. 1a schematically illustrates generation of fingerprint pair(s) to be used for synchronisation between an audio and a video signal.

FIG. 1a schematically illustrates generation of fingerprint pair(s) to be used for synchronisation between an audio and a video signal.

Shown are a digital or analog first signal 101 and a digital or analog second signal 103. In the following the first signal 101 is an audio signal and the second signal 103 is a video signal.

At one or more synchronisation time points $T_n$, $T_{n+1}$ a fingerprint pair has to be derived. These time points are selected according to at least one predetermined criteria. E.g. criteria specifying a time point at the beginning of the audio and/or video signal, a time point at the end and a time point in-between. Alternatively, the time points may be selected according to: one at the beginning and one time point for each point after a given period of time have lapsed, e.g. one time point for every 2 minutes or every 2 seconds, etc. Alternatively, the time points may be derived from analysis of the underlying signal itself, e.g. at each scene change in a video signal. Just a single synchronisation time point $T_n$, $T_{n+1}$ is needed in order to enable a synchronisation between the two signals 101, 103 according to the present invention. However, the use of more time points $T_n$, $T_{n+1}$ enables a better synchronisation e.g. in a situation where one (or both) of the signals have been truncated, modified, etc. One example taking advantage of several time points could e.g. be when a user has recorded a movie and has bought the original soundtrack as described earlier but where the movie has been recorded with commercial breaks. By adding more synchronisation time points a better synchronisation is enabled, especially if the synchronisation time points is at or near the end time points of the commercial breaks.

One audio fingerprint 102 is derived for each synchronisation time point $T_n$, $T_{n+1}$ for the audio signal 101 and a video fingerprint 104 is derived for the video signal 103 at the same synchronisation time point(s) $T_n$, $T_{n+1}$ resulting in a fingerprint pair 102, 104 for each synchronisation time point $T_n$, $T_{n+1}$. A fingerprint (for both audio and/or video) for a given time point $T_n$, $T_{n+1}$ is preferably derived on a segment of the signal where the segment (substantially) starts at the given time point. Alternatively, the segment may end (substantially) at the given time point $T_n$; $T_{n+1}$, or the segment may start or end at a predetermined distance (substantially) before or after the given time point $T_n$; $T_{n+1}$, or the given time point $T_n$; $T_{n+1}$ may be at a predetermined time point between a start and an end of the segment or any other scheme as long as the same scheme is applied during synchronisation to determine the given time point $T_n$; $T_{n+1}$ on the basis of a fingerprint as will be explained in more detail in connection with FIG. 1b.

The size of the fingerprints may both be of a predetermined fixed size or alternatively of a variable size.

One method for computing a robust fingerprint is described in international patent application WO 02/065782, although of course any method for computing a robust fingerprint can be used.

European patent application 01200505.4 describes a method that generates robust fingerprints for multimedia content such as, for example, audio clips, where the audio clip is divided in successive (preferably overlapping) time intervals. For each time interval, the frequency spectrum is divided in bands. A robust property of each band (e.g. energy) is computed and represented by a respective fingerprint bit.

Multimedia content is thus represented by a fingerprint comprising a concatenation of binary values, one for each time interval. The fingerprint does not need to be computed over the whole multimedia content, but can be computed when a portion of a certain length has been received. There can thus be plural fingerprints for one multimedia content, depending on which portion is used to compute the fingerprint over.

Further, video fingerprinting algorithms are known, e.g. from the following disclosure: Job Oostveen, Ton Kalker, Jaap Haitsma: "Feature Extraction and a Database Strategy for Video Fingerprinting". 117-128. IN: Shi-Kuo Chang, Zhe Chen, Suh-Yin Lee (Eds.): Recent Advances in Visual Information Systems, 5th International Conference, VISUAL 2002 Hsin Chu, Taiwan, Mar. 11-13, 2002, Proceedings. Lecture Notes in Computer Science 2314 Springer 2002.

According to the present invention, an audio fingerprint 102 and a video fingerprint 104 are generated for each time point $T_n$, $T_{n+1}$ on the basis of a given segment of the audio signal 101 and a segment of the video signal 103 at or near the specific time point.

In this way, a given fingerprint pair 102, 104 is a synchronisation marker enabling a very accurate and very precise location of a given time point of the signals 101 and 103 without using the specific time point but instead using (a segment of) the signal. Further, this is enabled without changing the signals. Even for video fingerprinting the localisation is typically frame accurate, at least as long as any distortion of the video signal is not too severe.

After a fingerprint pair 102, 104 has been generated it is preferably stored for later use in a database, memory, storage and/or the like.

There are several advantages in storing fingerprint pairs (102, 104 for multimedia signals 101, 103 in a database instead of the multimedia signals itself. To name a few:

The memory/storage requirements for the database are reduced.

The comparison of fingerprints is more efficient than the comparison of the multimedia signals themselves, as fingerprints are substantially shorter than the signals.

Searching in a database for a matching fingerprint is more efficient than searching for a complete multimedia signals, since it involves matching shorter items.

Searching for a matching fingerprint is more likely to be successful, as small changes to a multimedia signal (such as encoding in a different format or changing the bit rate) do not affect the fingerprint.

The generated fingerprint pairs 102, 104 stored in the database may then be distributed to one or more synchronisation devices (via the Internet or via other means) for synchronisation of the signals according to the present invention e.g. before playback, storage, further transmission of both (synchronised) signals, etc.

Note that the invention is also applicable to synchronisation of more than two signals and also to signals being other types of signal than audio and video, as long as a robust fingerprint may be obtained. In principal any number of signals may be synchronised according to the present invention. This would simply require an additional fingerprint at each time point $T_n$, $T_{n+1}$ for each additional signal.

Alternatively, the fingerprint pair may also be generated at different time points for the respective signals, i.e. one fingerprint of the fingerprint pair may be generated e.g. at 25 seconds of the first signal while the other fingerprint may be generated e.g. at 30 seconds of the second signal. However, this requires a well-defined relationship between with each respective time point (e.g. 25 seconds and 30 seconds in the above example) to a common time line/frame. This alternative embodiment will be described in greater detail in connection with FIG. 5.

Figure 1B:
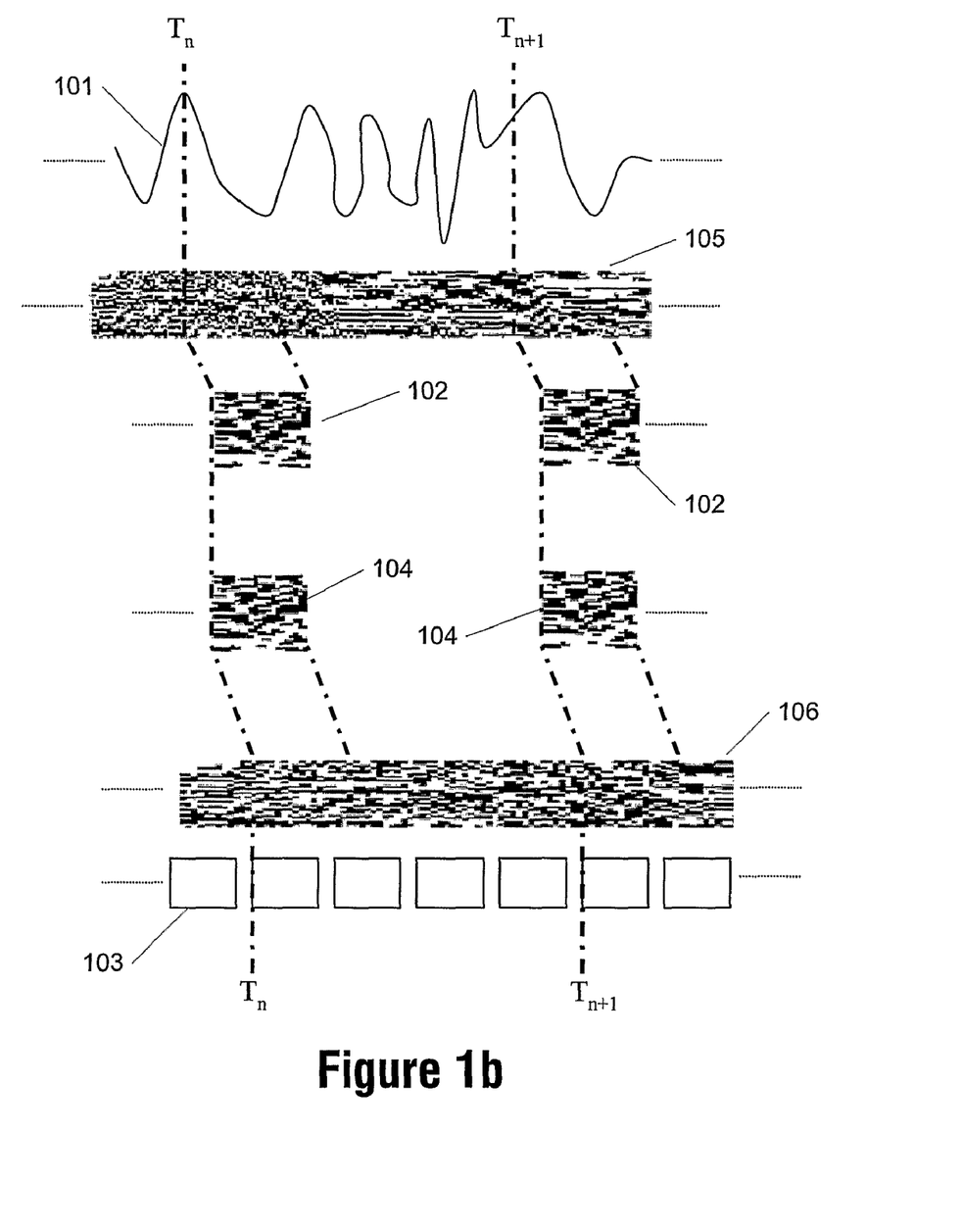
FIG. 1b schematically illustrates detection of such generated fingerprint pair(s) used for synchronisation according to the present invention.

FIG. 1b schematically illustrates detection of such generated fingerprint pair(s) used for synchronisation according to the present invention. Shown are a digital or analog first (to-be-synchronised) signal 101 and a digital or analog second (to-be-synchronised) signal 103. In the following the first signal (101 is an audio signal and the second signal 103 is a video signal. Further shown are a first fingerprint stream 105 and a second fingerprint stream 106 that are generated continuously or substantially continuously on the basis of the audio signal 101 and the video signal 103, respectively. Alternatively, the fingerprint streams 105, 106 are generated in segments. Each fingerprint stream 105, 106 (or segments) is compared with fingerprints 102, 104, e.g. stored in a database, in order to determine if there is a match or not. More specifically, the audio fingerprint stream 105 is compared with stored audio fingerprints 102 and the video fingerprint stream 106 is compared with stored video fingerprints 104. The stored fingerprints 102, 104 are generated as explained in connection with FIG. 1a e.g. at a central location. The stored fingerprints 102, 104 are e.g. received via the Internet or via some other means e.g. from the central location.

When a match between a segment of the audio fingerprint stream 105 and a given audio fingerprint 102 in the database is found and a match between a segment of the video fingerprint stream 106 and a given video fingerprint 104 in the database is found, i.e. when a matching fingerprint pair have been found, the appropriate synchronisation time point $T_n$; $T_{n+1}$ is also given when the fingerprints 102, 104 have been generated according to the present invention and as explained in connection with FIG. 1a.

The specific synchronisation time point $T_n$; $T_{n+1}$ is determined dependent on the scheme that has been used during generation of the audio fingerprint 102 and the video fingerprint 104 at that particular time point $T_n$; $T_{n+1}$.

Preferably, the specific synchronisation time point $T_n$; $T_{n+1}$ is given by letting the segment of the audio signal 101 and the segment of the video signal 103 that the matching fingerprint pair 102, 104 originally has been based on during generation (according to FIG. 1a) starting (substantially) at the given time point $T_n$; $T_{n+1}$. In alternative embodiments, the segment of the audio signal 101 and the segment of the video signal 103 end (substantially) at the given time point $T_n$; $T_{n+1}$, the segments of the audio and video signals 101, 103 are starting or ending at a predetermined distance before or after the given synchronisation time point $T_n$; $T_{n+1}$ or the given synchronisation time point $T_n$; $T_{n+1}$ may be at a predetermined time point between a start and an end of the segments of the audio signal 101 and the video signal 103.

The synchronisation device simply needs to be aware of the relationship between a given fingerprint and the given time point used during generation, which may be determined and implemented during manufacture of the synchronisation device or alternatively be updatable.

As explained, after a matching fingerprint pair 102, 104 is determined, the time point $T_n$; $T_{n+1}$ of this pair is also know and serves as a synchronisation time point as this time point directly gives a reference point between the two signals 101 and 103. The synchronisation device then compensates for the delay (if any) between the two signals e.g. by shifting one of them so that they are aligned with respect to the time point.

The above-mentioned international patent application WO 02/065782 describes various matching strategies for matching fingerprints computed for an audio clip with fingerprints stored in a database. One such method of matching a fingerprint representing an unknown information signal with a plurality of fingerprints of identified information signals stored in a database to identify the unknown signal uses reliability information of the extracted fingerprint bits. The fingerprint bits are determined by computing features of an information signal and thresholding said features to obtain the fingerprint bits. If a feature has a value very close to the threshold, a small change in the signal may lead to a fingerprint bit with opposite value. The absolute value of the difference between feature value and threshold is used to mark each fingerprint bit as reliable or unreliable. The reliabilities are subsequently used to improve the actual matching procedure.

In this way, synchronisation may be obtained even though one of the signals e.g. the video signal, has been obtained in a lesser quality, has been modified (e.g. compressed), etc.

Please note that the audio signal 101 and/or the video signal 103 may be a distorted version of the signal used during generation of the fingerprints, i.e. the signals of FIG. 1a.

As mentioned in connection with FIG. 1a, this embodiment may easily be modified to accommodate synchronisation of more than two signals and/or signals of another type than audio and/or video.

Figure 2:
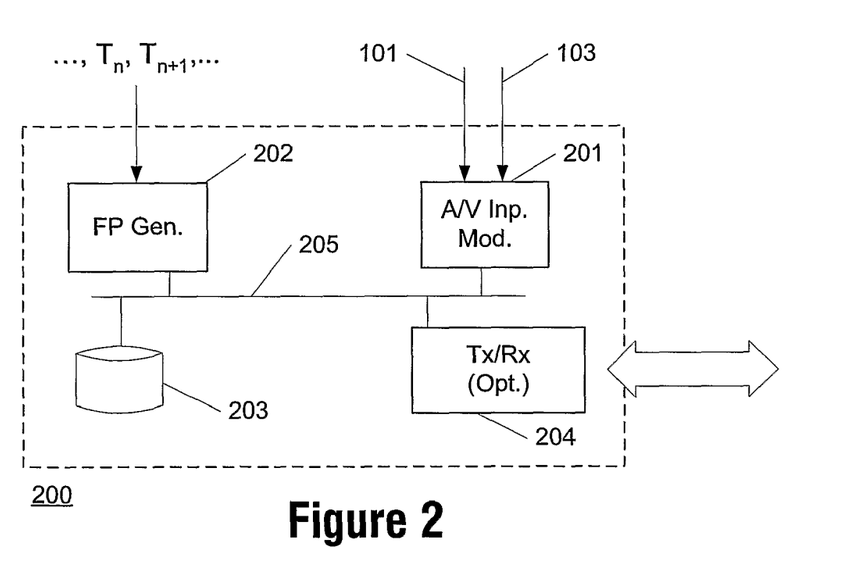
FIG. 2 illustrates a schematic block diagram of a fingerprint generation device according to the present invention.

FIG. 2 illustrates a schematic block diagram of a fingerprint generation device according to the present invention.

Shown is fingerprint generation device 200 comprising a signal input module 201, a fingerprinting module 202, a data base, memory storage and/or the like 203 communicating via a bus 205 or the like under the control of one or more microprocessors (not shown). The fingerprint generation device 200 may in one embodiment optionally also comprise a transmitter and receiver 204 for communicating with other systems, devices, etc. via a wired and/or wireless network e.g. like the Internet.

The signal input module 201 receives a first 101 and at least a second 103 signal. In the following two signals are received comprising multimedia content in the form of an analog or digital audio signal and a video signal. The input module 201 feeds the two signals to the fingerprinting module 202. The fingerprinting module 202 also receives a representation of the time points ( . . . , $T_n$, $T_{n+1}$, . . . ) that are to be used as synchronisation time points. Alternatively, the time points are derived by the fingerprint generation device 200. If the time points are supplied and not generated by the fingerprint generation device 200 then it is not necessary to supply the fingerprint generation device 200 with the complete audio signal 101 and complete video signal 103. It is then sufficient only to provide the respective segments of the audio signal 101 and video signal 103 that is used for the fingerprint generation, i.e. a segment of each signal for each time point.

The transmitter and receiver 204 may also be responsible for receiving one or more of the signals 101 and 103 and supply it/them to the signal receiver 301 or directly to the fingerprint detector 302.

The fingerprinting module 202 computes a fingerprint on the basis of the received audio 101 and video 103 signals. A fingerprint may be derived for the entire content or for a part of the content. Alternatively, several fingerprints may be derived each from a different part. According to the present invention, a fingerprint is derived for each time point $T_n$, $T_{n+1}$, as explained in connection with FIG. 1a. Alternatively, the fingerprinting module 202 may be divided into or comprise two, e.g. distinct, fingerprint modules, one module for deriving audio fingerprints and one module for deriving video fingerprints.

Figure 4:
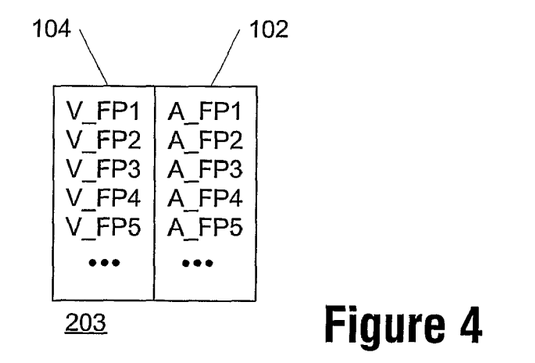
FIG. 4 illustrates one example of tables/records according to the present invention.

The fingerprinting module 202 then supplies the computed fingerprint pair(s) to the database 203. As shown in FIG. 4, the database 203 comprises video fingerprints organised by one column comprising video fingerprints 104 'V_FP1', 'V_FP2', 'V_FP3', 'V_FP4', 'V_FP5', etc. and corresponding audio fingerprints 102 'A_FP1', 'A_FP2', 'A_FP3', 'A_FP4', 'A_FP5', etc.

The database 203 can be organised in various ways to optimise query time and/or data organisation. The output of the fingerprinting module 202 should be taken into account when designing the tables in the database 203. In the embodiment shown in FIG. 4, the database 203 comprises a single table with entries (records) comprising respective fingerprint pairs.

As mentioned, this exemplary embodiment may easily be modified to accommodate synchronisation of more than two signals and/or signals of another type than audio and/or video.

Figure 3:
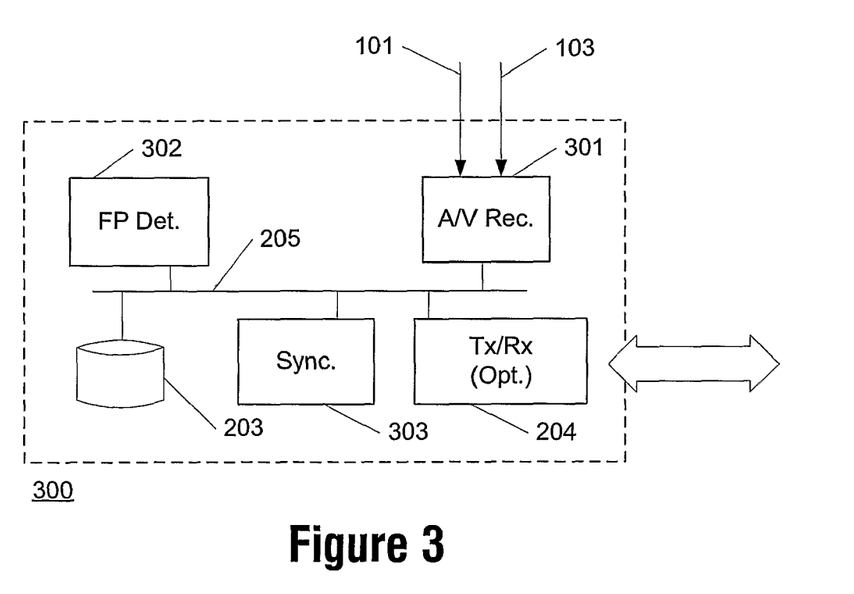
FIG. 3 illustrates a schematic block diagram of a synchronisation device detecting and using fingerprints according to the present invention.

FIG. 3 illustrates a schematic block diagram of a synchronisation device detecting and using fingerprints according to the present invention.

Shown is a synchronisation device 300 comprising a signal receiver 301, a fingerprint detector 302, a synchronisation circuit 303, a database, memory storage and/or the like 203 communicating via a bus 205 or the like under the control of one or more microprocessors (not shown). The synchronisation device 300 may in one embodiment optionally also comprise a transmitter and receiver 204 for communicating with other systems, devices, etc. via a wired and/or wireless network e.g. like the Internet.

The signal receiver 301 receives a first 101 and at least a second 103 signal. In the following two signals are received comprising multimedia content in the form of an analog or digital audio signal and an analog or digital video signal to be synchronised. The transmitter and receiver 204 may also be responsible for receiving one or more of the signals 101 and 103 and supply it/them to the signal receiver 301 or directly to the fingerprint detector 302.

The received signals are feed to the fingerprint detector 302 that derives a fingerprint stream or segments thereof for each signal and determines if there are any matches with fingerprint pairs stored in the database 203 as explained in connection with FIG. 1b. If a match is found then the specific synchronisation time point $T_n$; $T_{n+1}$ for each signal are also determined. The specific determination of the synchronisation time point $T_n$, $T_{n+1}$ for each signal is dependent on the scheme that have been used during generation of the audio fingerprint 102 and the video fingerprint 104 at that particular time point $T_n$; $T_{n+1}$.

Preferably, the specific synchronisation time point $T_n$; $T_{n+1}$ is given by letting the segment of the audio signal 101 and the segment of the video signal 103 that the matching fingerprint pair 102, 104 originally has been based on during generation (according to FIG. 1a) starting (substantially) at the given time point $T_n$; $T_{n+1}$. In alternative embodiments, the segment of the audio signal 101 and the segment of the video signal 103 end (substantially) at the given time point $T_n$; $T_{+1}$, the segments of the audio and video signals 101, 103 are starting or ending at a predetermined distance before or after the given synchronisation time point $T_n$; $T_{+1}$ or the given synchronisation time point $T_n$; $T_{n+1}$ may be at a predetermined time point between a start and an end of the segments of the audio signal 101 and the video signal 103.

The synchronisation device simply needs to be aware of the relationship between a given fingerprint and the given time point used during generation, which may be determined and implemented during manufacture of the synchronisation device or alternatively be updatable.

As explained, after a matching fingerprint pair 102, 104 is determined, the time point $T_n$; $T_{n+1}$ for each fingerprint of this pair is also known (although not necessary its value but only its location in both the audio and in the video signal) and serves as a synchronisation time point as these time points directly gives a reference point between the two signals 101 and 103. The synchronisation circuit 303 then compensates for the delay or offset (if any) between the two signals e.g. by shifting one of them or both so that they are aligned with respect to the synchronisation time point.

As a simple example, say that a synchronisation time point is at 5 minutes and 34 seconds of the signals 101 and 103 during generation according to FIG. 1a. During the generation of fingerprints (according to FIG. 1a) one audio fingerprint would be derived at or near (depending on the used scheme) 5 minutes and 34 seconds in the audio signal 101 and one video fingerprint would also be derived at or near (depending on the used scheme) 5 minutes and 34 seconds in the video signal 103. These two fingerprints would then be stored and transmitted to a synchronisation device carrying out the synchronisation between the two signals. At the synchronisation device a fingerprint stream 105 of the audio signal and a fingerprint stream 106 of the video signal would be compared against the stored two fingerprints. When a match between the stored audio fingerprint and the audio fingerprint stream is found, then the location of the match (e.g. $T_n$ in 105 in FIG. 1b) in the fingerprint stream gives the used synchronisation time point, i.e. what should correspond 5 minutes and 34 seconds. Likewise, when a match between the stored video fingerprint and the video fingerprint stream is found, then the location of the match (e.g. $T_n$ in 106 in FIG. 1b) in the fingerprint stream gives the used synchronisation time point, i.e. 5 minutes and 34 seconds. The two signals may be shifted, but the exact location in the signals (as given by the segment of the fingerprint stream that matches a stored fingerprint) of what should be 5 minutes and 34 seconds may then be used to align the two signals. The specific value of the time point (5 minutes and 34 seconds) does not even need to be known or derived specifically. The only knowledge needed is that the fingerprint matching location of the two signals 101; 103 should be aligned/synchronised. The synchronisation time point of 5 minutes and 34 seconds may for example correspond to 5 minutes and 34 seconds in the audio signal (e.g. because this is the original sound track used during generation of the audio fingerprint) and to 6 minutes and 3 seconds in the video signal (e.g. if the video signal further comprises commercial breaks compared to the 'original video signal used during the generation of the video fingerprint). The difference/offset between the two time-values (6 min. 3 sec.-5 min. 34 sec.=29 sec.) may then be used to compensate for the delay, e.g. by shifting the playback so that both the audio signal and the video signal is played at the same time at the synchronisation time point and forward (if no further modifications of either signals is present, e.g. an additional commercial break, etc.).

Preferably, the data layout of the database 203 corresponds to the one shown in FIG. 4.

As mentioned, this exemplary embodiment may easily be modified to accommodate synchronisation of more than two signals and/or signals of another type than audio and/or video.

FIG. 4 illustrates one example of tables/records according to the present invention. Shown is a table comprising fingerprint pairs 102, 104. The table is, in this example, organised by one column comprising video fingerprints 'V_FP1', 'V_FP2', 'V_FP3', 'V_FP4', 'V_FP5', etc. and one column comprising the respective corresponding audio fingerprints 102 'A_FP1', 'A_FP2', 'A_FP3', 'A_FP4', 'A_FP5', etc.

Figure 5:
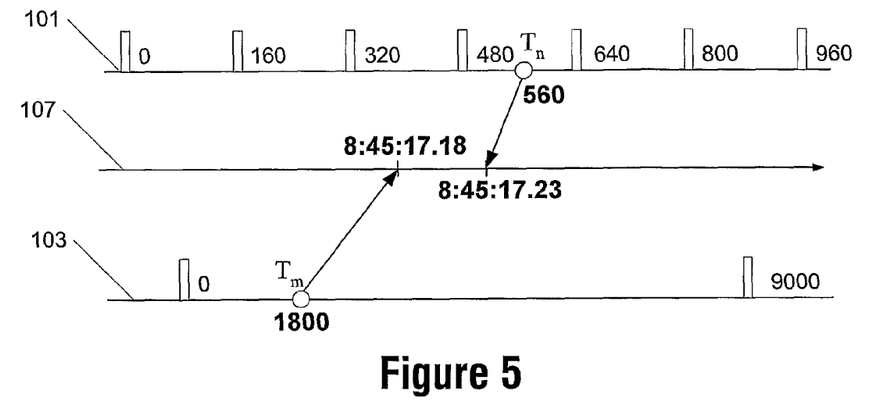
FIG. 5 illustrates an alternative embodiment of a relationship between time points in a first and in a second signal.

FIG. 5 illustrates an alternative embodiment of a relationship between time points in a first and in a second signal. Shown are a first signal 101 and a second signal 103. In this embodiment, a third or reference or common or internal time clock/line 107 (forth only denoted reference time line) is also shown to better explain the principle of this embodiment.

In this particular example of the alternative embodiment, a fingerprint (not shown) has been generated for the first signal 101 at a first synchronisation time point $T_n$ having the value of 560. This particular time point $T_n$ for the first signal 101 is related to a reference time frame as indicated by the reference time line 107 (as indicated by an arrow) to a time point having a value of 8:45:17.23 (indicating that the first signal at $T_n$=560 should be presented at 8:45:17.23) on the reference time line 107. A representation of this indication or relationship between the particular time point $T_n$ for the first signal 101 (i.e. a first representation) may be associated with the generated first fingerprint and stored in a database (e.g. the same or a different than the one containing the generated fingerprint) as will be explained later.

Further, a fingerprint (not shown) has been generated for the second signal 103 at a second synchronisation time point $T_m$ having the value of 1800. This particular time point $T_m$ for the second signal 103 is also related to the same reference time frame as indicated by the reference time line 107 (as indicated by an arrow) to a time point having a value of 8:45:17.18 on the reference time line 107 (indicating that the second signal at $T_m$=1800 should be presented at 8:45:17.18). A representation of this indication or relationship between the particular time point $T_m$ for the second signal 101 (i.e. a second representation) may be associated with the generated second fingerprint and stored in a database (e.g. the same or a different than the one containing the generated fingerprint) as will be explained later.

The first and second representation may e.g. simply be the reference time points of the first and second signal, respectively. In the above example, the value 8:45:17.23 would then be stored with the fingerprint generated at $T_n$=560 and the value 8:45:17.18 would then be stored with the fingerprint generated at $T_m$=1800.

During synchronisation, a synchronisation device according to this embodiment generates a first and a second fingerprint stream or fingerprint segments as explained in connection with FIG. 1b. Each fingerprint stream (or segments) is compared with fingerprints, e.g. stored in a local or remote database, in order to determine if there is a match or not, also as explained in connection with FIG. 1b. When a matching first and second fingerprint has been found then the first $T_n$ (i.e. 560 in the above example) and second synchronisation time points $T_m$ (i.e. 1800 in the above example) are also known or derivable. Then using the above-mentioned first and second representation of the relationship to a reference time frame it is possible to determine how the signals should be synchronised according to a given time frame.

As mentioned the first and second representation may be stored in one or more databases and should be communicated to a synchronisation device before synchronisation. In one embodiment the first and second representations are communicated directly to the synchronisation device for storage from a fingerprint generation device. Alternatively, the first and second representations are communicated to another device, e.g. a server, capable of communicating with a synchronisation device. This embodiment will be explained in greater detail in connection with FIG. 6.

Figure 6:
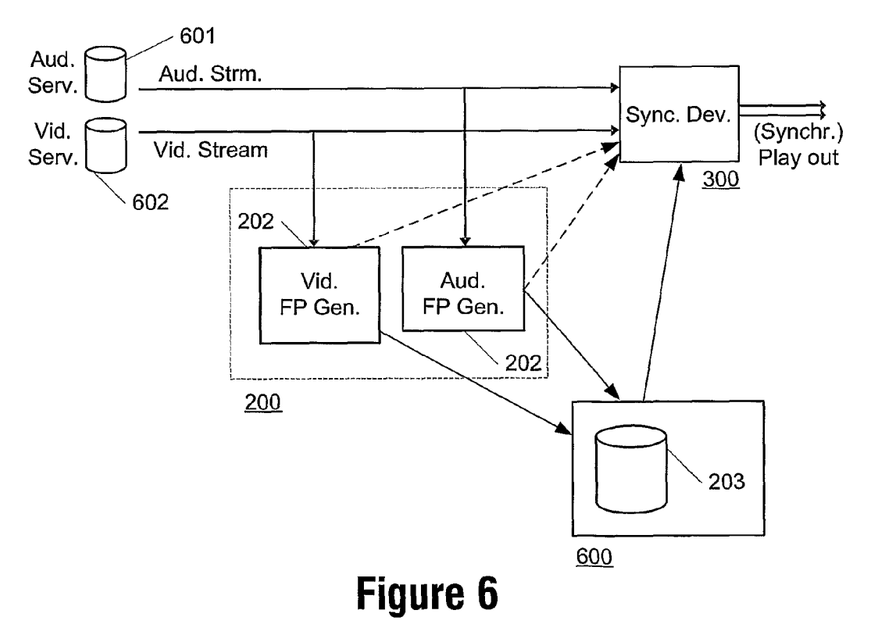
FIG. 6 illustrates an embodiment where first and second representations are stored at a remote location.

FIG. 6 illustrates an embodiment where first and second representations are stored at a remote location. Shown are an audio server 601 and a video server 602 providing an audio stream and a video stream to an audio fingerprint generator 202 and a video fingerprint generator 202, respectively. The audio and video fingerprint generator 202 functions as described in connection with FIG. 2 and may be located in the same fingerprint generation device 200 or two different ones. In this embodiment, the generated fingerprints are supplied to a database 203 located at a (database) server 600 in communications connection with a synchronisation device 300. The server 600 also receives and stores a first representation for each audio fingerprint and a second representation for each video fingerprint, as described e.g. in connection with FIG. 5, i.e. the representations of the relationship between time points of the audio and video streams and a common reference time line or time frame.

The synchronisation device 300 functions as described in connection e.g. with FIGS. 3 and 5. It receives the audio and video stream to be synchronised from the audio and video servers 601, 602 and generates a fingerprint stream or fingerprints segments of each and compares against predetermined fingerprints (corresponding to 102 and 104 of FIGS. 1a and 1b) signifying synchronisation time points, as described earlier. The predetermined fingerprints may be received from the fingerprint generation device 200 (as indicated by two broken arrows) or from the server 600. If the predetermined fingerprints are received from the server 600 storage is saved in the synchronisation device 300, which may have a more limited storage capability. The first and second representation for each fingerprint pair is preferably also received from the server 600 and is used in order to synchronise the audio and video stream before playback as described in connection with FIG. 5.

The server(s) may have stored predetermined fingerprints and/or their associated first and second representations for several different audio and video streams.

So, in one embodiment, the predetermined fingerprints are stored at the synchronisation device 200 while the first and second representations are stored at one or more servers 600. When a fingerprint pair has been detected, the first and second representations of that pair are transmitted from the server(s) and used in the synchronisation device 200. Alternatively, all the first and second representation of all predetermined fingerprints of a given audio and video streams may be supplied to the synchronisation device 200 before synchronisation is begun, e.g. based on stream ID(s), etc.

In an alternative embodiment, the predetermined fingerprints along with their associated first and second representations are stored only at one or more servers 600. Prior to the synchronisation of the streams both the fingerprints and their associated first and second representations are transmitted to the synchronisation device 200 e.g. based stream ID or the like. Alternatively, only the fingerprints are transmitted before synchronisation are begun and upon detection of matching fingerprints the associated first and second representations are transmitted to the synchronisation device 200.

Please note that there will usually be a period time between the generation of fingerprints on the basis of the audio and video stream and when these streams are supplied to the synchronisation device 300.

The database 203 may be a single database or several databases that may be located at a single or several servers.

Figure 7:
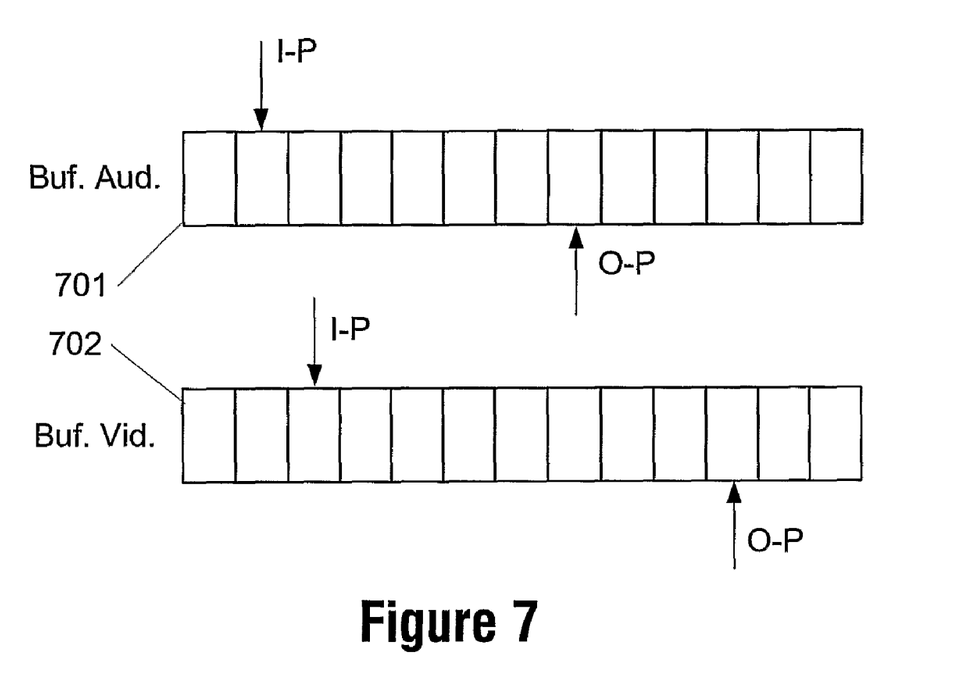
FIG. 7 illustrates schematically more specifically how the synchronisation in one embodiment may be done in a synchronisation device using buffers.

FIG. 7 illustrates schematically more specifically how the synchronisation in one embodiment may be done in a synchronisation device using buffers. Illustrated are a buffer 701 for buffering audio data and a buffer 702 for buffering video data. For the audio buffer 701 an in-pointer I-P indicates where the next audio sample, arriving from the audio stream, is to be placed in the buffer. An out-pointer O-P indicates where the next audio sample is to be read. The out-pointer moves to the next slot at a pace set by a clock of the synchronisation device.

For the video buffer 702 an in-pointer I-P and an out-pointer O-P are shown that function in the same way as for explained for the audio buffer 701.

Depending on a first representation (e.g. already present in the synchronisation device or received from a server as explained earlier), the out-pointer is adjusted, i.e. shifted to earlier or later slot in the buffer 701.

Likewise also for a second representation for the video buffer 702.

In this way, the out-pointers are adjusted on the basis of the first and second representations and thereby synchronise the out streams in a very simple way.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A computer-implemented method of synchronizing two or more signals, the method comprising:
    generating a first fingerprint stream on the basis of a first signal,
    generating a second fingerprint stream on the basis of a second signal,
    comparing a segment of the first fingerprint stream with one or more first fingerprints stored in at least one database in order to determine if a match exists or not,
    comparing a segment of the second fingerprint stream with one or more second fingerprints stored in the at least one database in order to determine if a match exists or not, and
    if a match exists for both a first and a second fingerprint determining a location of a first synchronization time point (Tn, Tn+1) for the first signal and a location of a second synchronization time point (Tn, Tn+1; Tm) for the second signal and synchronizing the first and the second signal using the determined locations.

2. A method according to claim 1, wherein synchronizing comprises: delaying either the first or the second signal by an amount equal to a difference, if any, between the location of the first synchronization time point (Tn, Tn+1) for the first signal and the location of the second synchronization time point (Tn, Tn+1; Tm) for the second signal.

3. A method according to claim 1, wherein the location of at least one of the first and the second synchronization time point (Tn, Tn+1; Tm) for the first/and the second signal are given by an unambiguous relation with at least one of a segment of a first signal and a segment of a second signal used during generation of the matching first fingerprint and of the matching second fingerprint.

4. A method according to claim 1, wherein the first and second synchronization time point (Tn; Tn+1; Tm) is the same.

5. A method according to claim 1, wherein the first and second synchronization time point (Tn; Tn+1; Tm) is different and in that the method further comprises:
    if a match exists for both a first and a second fingerprint
        obtaining a first representation of a relationship between the first synchronization time point (Tn; Tn+1) and a first time point of a reference time,
        obtaining a second representation of a relationship between the second synchronization time point (Tn; Tn+1; Tm) and a second time point of said reference time, and
        using the first and second time points of said reference time to synchronize the first and the second signal,
    instead of
    determining, if a match exists for both a first and a second fingerprint, a location of a first synchronization time point (Tn, Tn+1) for the first signal and a location of a second synchronization time point (Tn, Tn+1; Tm) for the second signal and synchronizing the first and the second signal using the determined locations.

6. A method according to claim 5, wherein the method further comprises at least one of:
    receiving at least one of the first and second representation in synchronization device from a server in communications connection with the synchronization device, and
    receiving the one or more first fingerprints and second fingerprints from the server.

7. A synchronization device for synchronizing two or more signals, the device comprising:
    means for generating a first fingerprint stream on the basis of a first signal,
    means for generating a second fingerprint stream on the basis of a second signal,
    means for comparing a segment of the first fingerprint stream with one or more first fingerprints stored in at least one database in order to determine if a match exists or not,
    means for comparing a segment of the second fingerprint stream with one or more second fingerprints stored in the at least one database in order to determine if a match exists or not, and
    means for, if a match exists for both a first and a second fingerprint, determining a location of a first synchronization time point (Tn; Tn+1) for the first signal and determining a location of a second synchronization time point (Tn; Tn+1; Tm) for the second signal and means for synchronizing the first and the second signal using the determined locations.

8. A device according to claim 7, wherein the means for synchronizing is adapted to: delay either the first or the second signal by an amount equal to a difference, if any, between the location of the synchronization time point (Tn; Tn+1) for the first signal and the location of the synchronization time point (Tn; Tn+1; Tm) for the second signal.

9. A device according to claim 7, wherein the location of at least one of the first and second synchronization time point (Tn; Tn+1; Tm) for at least one of the first and second signal are given by an unambiguous relation with at least one of a segment of a first signal and a segment of a second signal used during generation of the matching first fingerprint and of the matching second fingerprint.

10. A device according to claim 7, wherein the first and second synchronization time point (Tn; Tn+1; Tm) is the same.

11. A device according to claim 7, wherein the first and second synchronization time point (Tn; Tn+1; Tm) is different and in that the device further comprises:
 if a match exists for both a first and a second fingerprint,
 a receiver for obtaining a first representation of a relationship between the first synchronization time point (Tn; Tn+1) and a first time point of a reference time,
 a receiver for obtaining a second representation of a relationship between the second synchronization time point (Tn; Tn+1; Tm) and a second time point of said reference time, and
 synchronization means for using the first and second time points of said reference time to synchronize the first and the second signal,
 instead of comprising
 means for, if a match exists for both a first and a second fingerprint, determining a location of a first synchronization time point (Tn; Tn+1) for the first signal and determining a location of a second synchronization time point (Tn; Tn+1; Tm) for the second signal and means for synchronizing the first and the second signal using the determined locations.

12. A device according to claim 11, wherein the device further comprises at least one of:
 a receiver for receiving at least one of the first and second representation in a synchronization device from a server in communications connection with the synchronization device, and
 a receiver for receiving the one or more first fingerprints and second fingerprints from the server.

* * * * *

UNITED STATES PATENT AND TRADEMARK OFFICE
CERTIFICATE OF CORRECTION

| | | |
|---|---|---|
| PATENT NO. | : 7,907,211 B2 | Page 1 of 1 |
| APPLICATION NO. | : 10/566003 | |
| DATED | : March 15, 2011 | |
| INVENTOR(S) | : Job C. Oostveen et al. | |

It is certified that error appears in the above-identified patent and that said Letters Patent is hereby corrected as shown below:

On the face page, in field (56), under "Other Publications", in column 2, line 1, delete "Filngerprinting" and insert -- Fingerprinting --, therefor.

On the face page, in field (56), under "Other Publications", in column 2, line 3, delete "Watermarkting" and insert -- Watermarking --, therefor.

On the face page, in field (56), under "Other Publications", in column 2, line 4, delete "Communicaiton" and insert -- Communication --, therefor.

In column 1, line 64, after "signals" insert -- . --.

In column 12, line 25, in Claim 6, delete "in" and insert -- in a --, therefor.

Signed and Sealed this
Third Day of May, 2011

David J. Kappos
*Director of the United States Patent and Trademark Office*